United States Patent [19]

DeMars et al.

[11] Patent Number: 5,341,914
[45] Date of Patent: Aug. 30, 1994

[54] DEVICE FOR FEEDING CORN

[75] Inventors: Jimmy A. DeMars, Hugo, Minn.;
Virgil Ruhter, Jr.; John Warner, both of Buhl, Id.; William G. Schmidt, Maple Grove, Minn.

[73] Assignee: The Pillsbury Company, Minneapolis, Minn.

[21] Appl. No.: 10,484

[22] Filed: Jan. 28, 1993

Related U.S. Application Data

[63] Continuation of Ser. No. 744,708, Aug. 12, 1991, abandoned.

[51] Int. Cl.⁵ .............................................. B65G 47/30
[52] U.S. Cl. .................................. 198/418.6; 198/445
[58] Field of Search .............. 198/396, 445, 461, 631, 198/418.1, 418.6, 433

[56] References Cited

U.S. PATENT DOCUMENTS

| | | | |
|---|---|---|---|
| 1,869,457 | 8/1932 | Benoit | 198/418.6 X |
| 2,715,387 | 8/1955 | Marmet | 119/155 |
| 2,813,615 | 11/1957 | Klein | 198/433 |
| 3,139,184 | 6/1964 | Rice et al. | 209/121 |
| 3,250,372 | 5/1966 | Wagner et al. | 198/396 |
| 3,268,057 | 9/1966 | Ross et al. | 198/396 |
| 3,394,805 | 7/1968 | Ross et al. | 198/373 X |
| 3,949,861 | 4/1976 | Scholtens et al. | 198/358 |
| 3,973,667 | 8/1976 | Jellema et al. | 198/418.6 |
| 4,040,303 | 8/1977 | Makino | 74/61 |
| 4,462,508 | 7/1984 | Grafius | 221/201 |
| 4,586,613 | 5/1986 | Horii | 209/556 |
| 4,771,894 | 9/1988 | Lapp | 209/632 |
| 4,863,008 | 9/1989 | Doi | 198/418.6 X |

FOREIGN PATENT DOCUMENTS

| | | | |
|---|---|---|---|
| 0098311 | 1/1984 | European Pat. Off. . | |
| 1973965 | 9/1967 | Sweden . | |
| 457442 | 2/1975 | U.S.S.R. | 198/445 |
| 614767 | 7/1978 | U.S.S.R. | 198/445 |

*Primary Examiner*—Cheryl L. Gastineau
*Attorney, Agent, or Firm*—Kinney & Lange

[57] ABSTRACT

A device for placing elongated objects transversely onto a conveyor is disclosed. A preferred device is adapted for moving ears of corn. The preferred device includes a vibratory trough feeder which arranges and moves the ears substantially end to end and into a plurality of lanes, a plurality of drop gates for dropping a group of ears onto a receiving conveyor below, an eccentric conveyor for moving the ears from the lanes into the drop gates, a mechanism for actuating the drop gates, and a receiving conveyor capable of traveling in a direction substantially perpendicular to the lanes, and located beneath the drop gates.

37 Claims, 10 Drawing Sheets

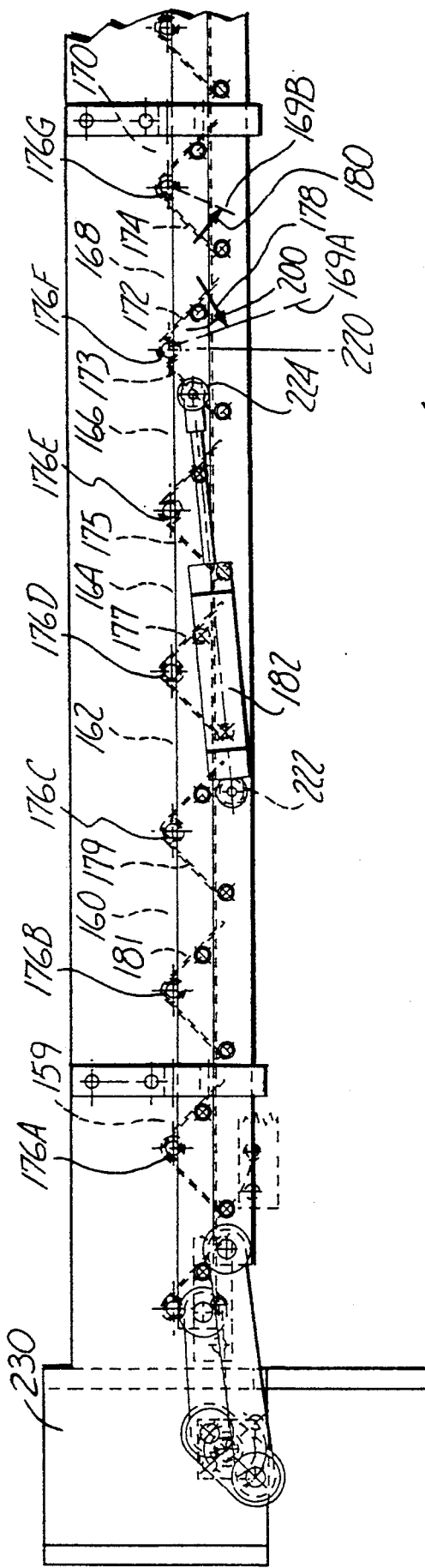
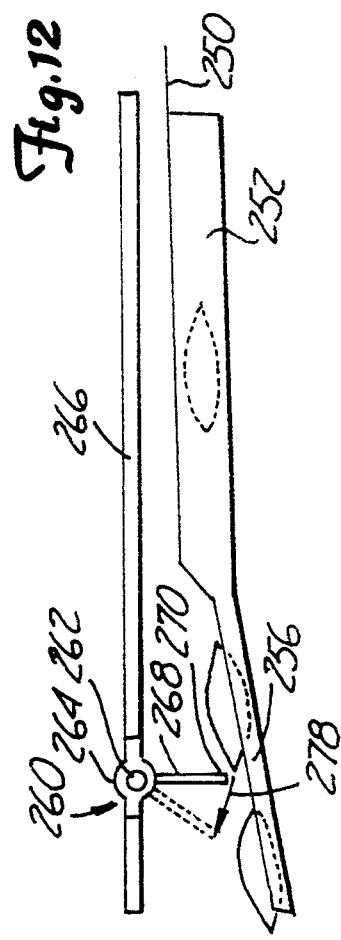
Fig. 6
Fig. 12

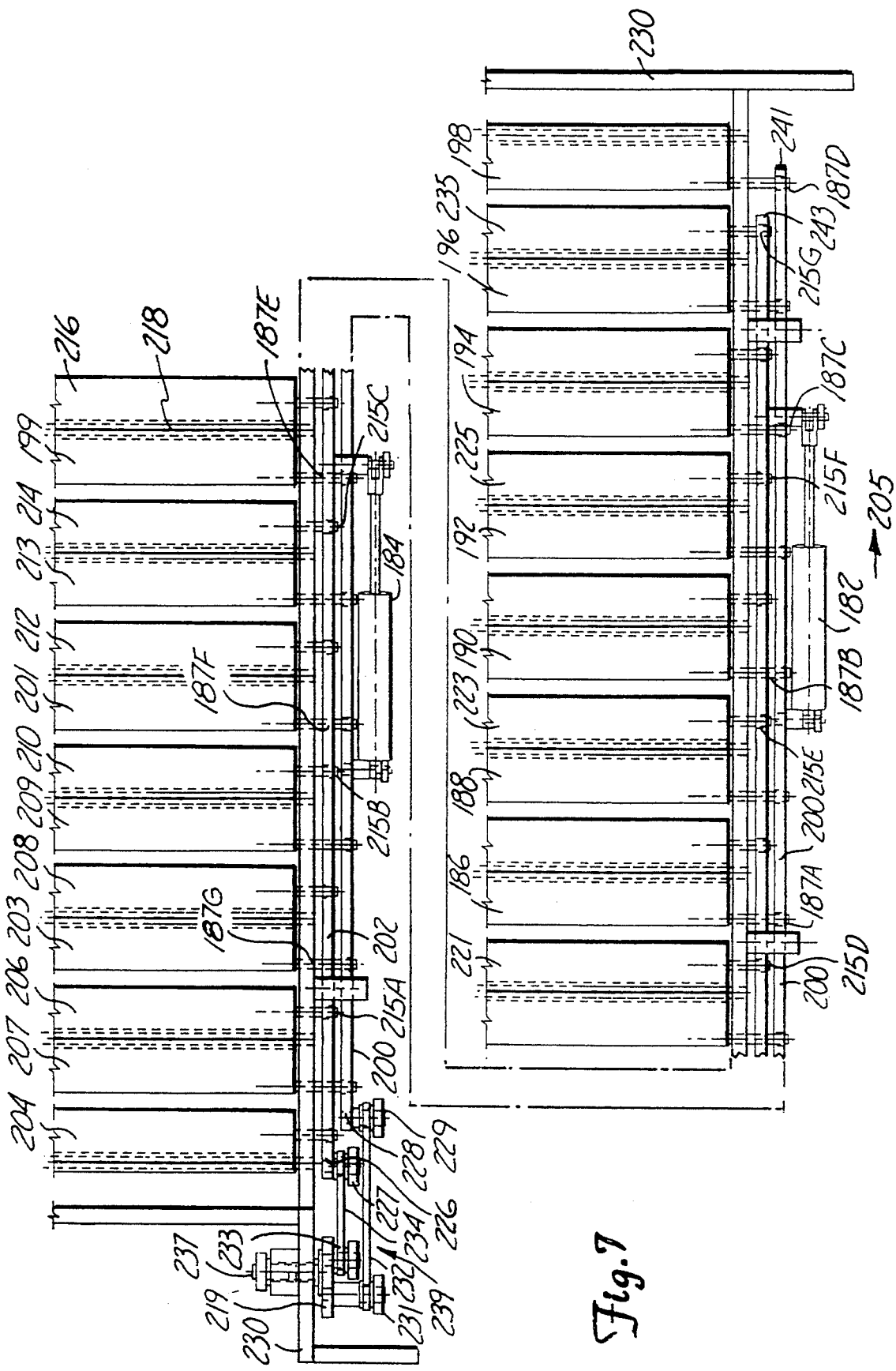

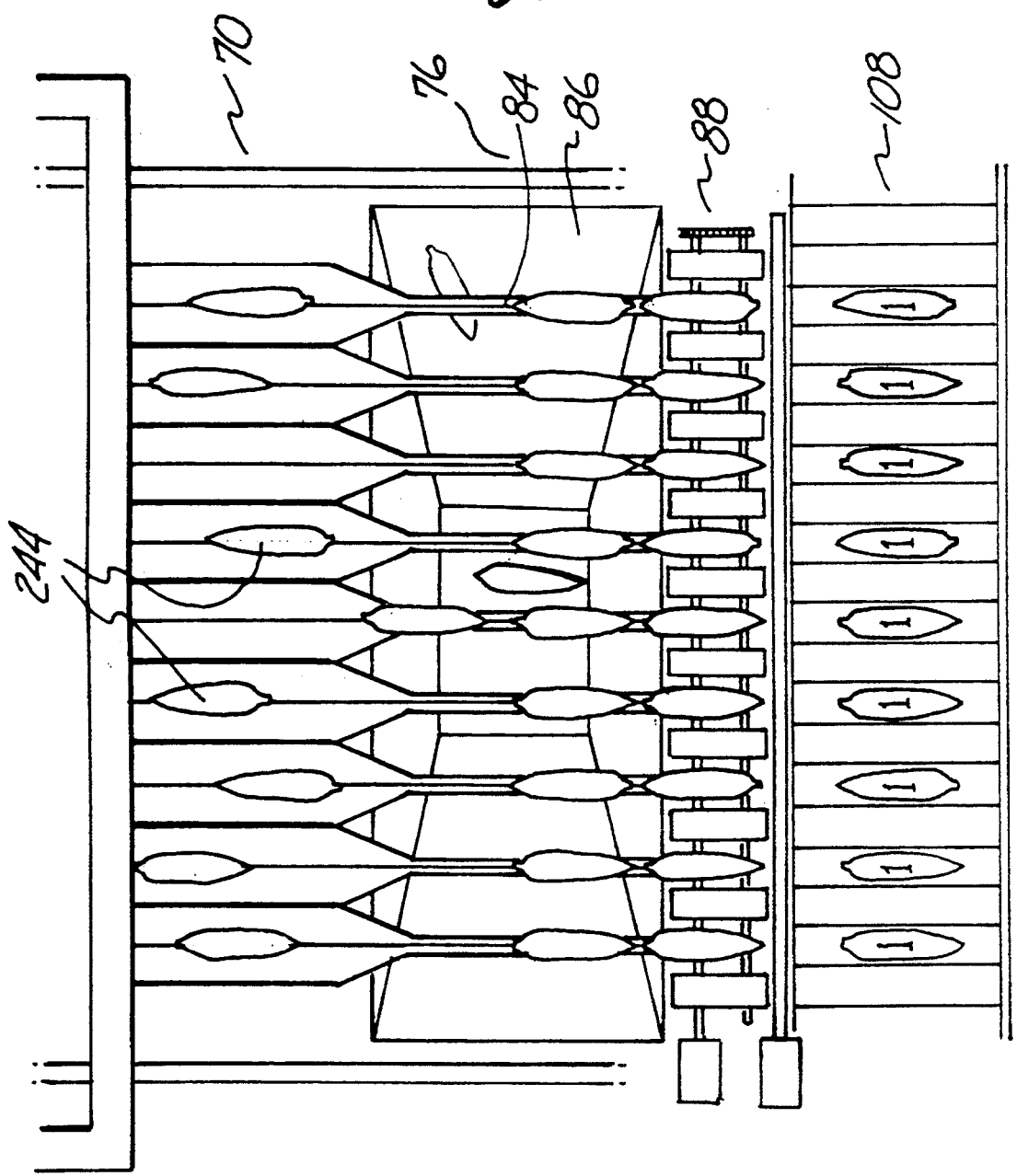

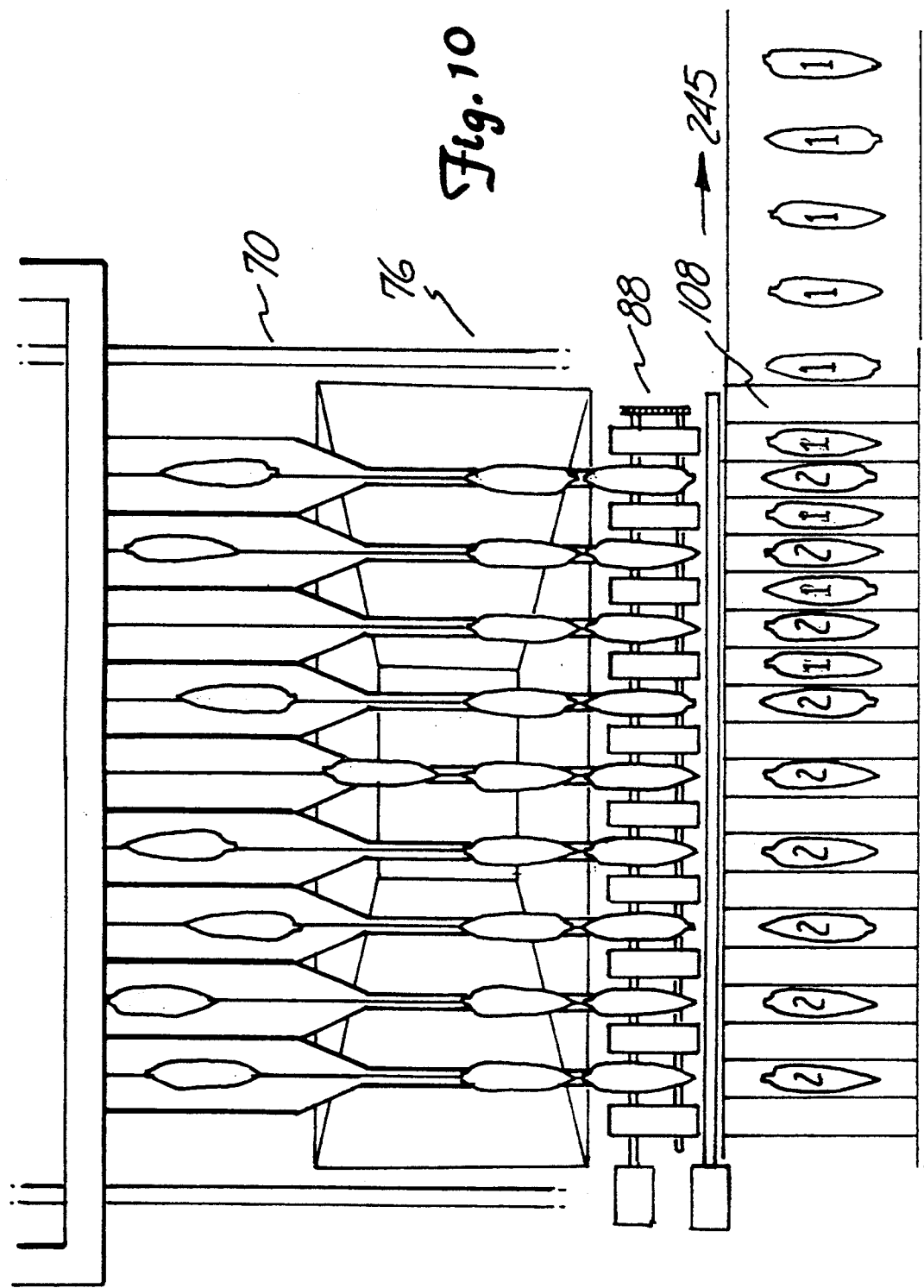

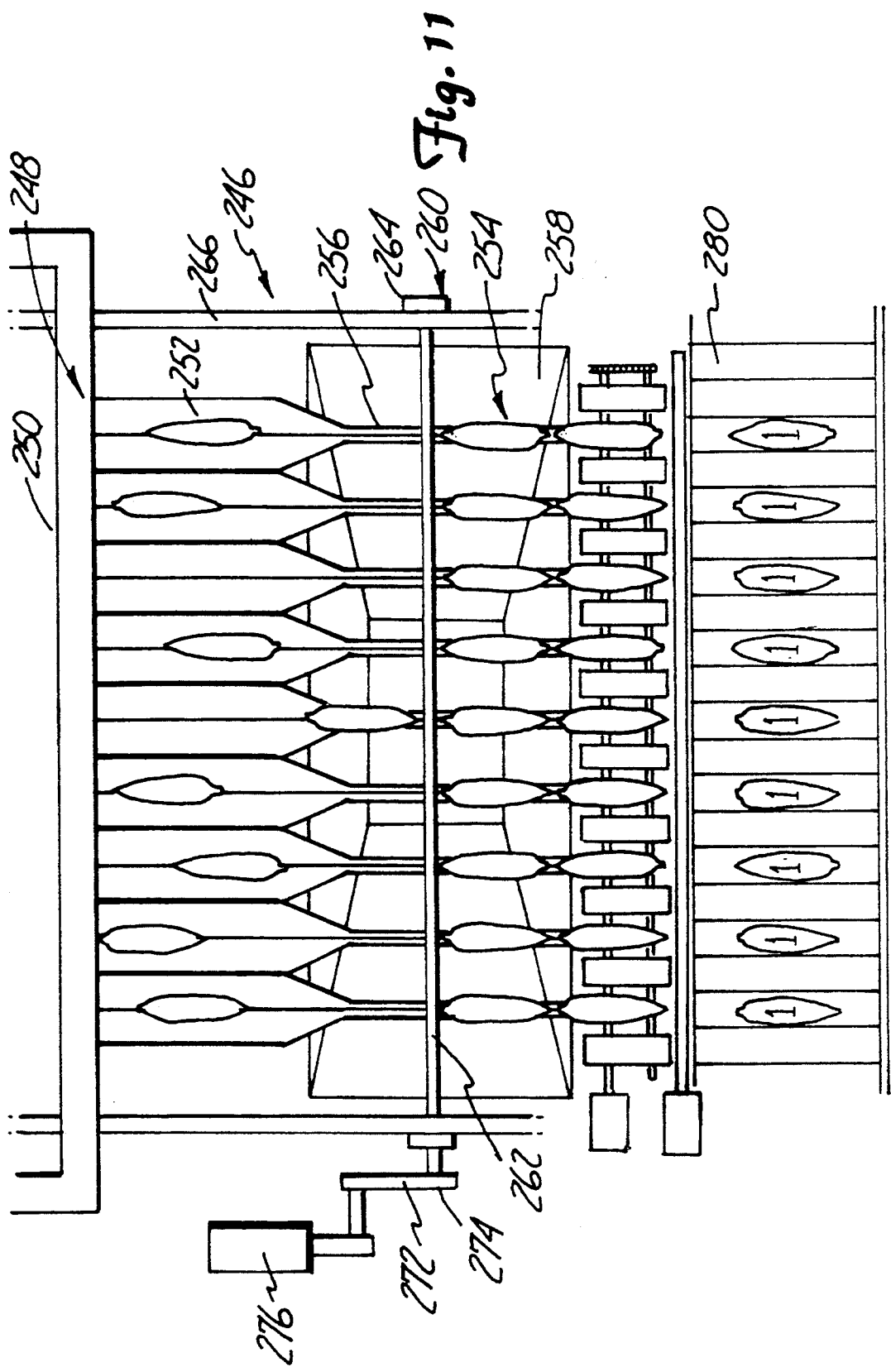

DEVICE FOR FEEDING CORN

This is a continuation of application Ser. No. 07/744,708 filed on Aug. 12, 1991, abandoned as of the date of this application.

BACKGROUND OF THE INVENTION

The present invention relates generally to an apparatus for delivering elongated objects to a conveyor. In particular, it relates to a device for depositing ear corn transversely onto a compartmented receiving conveyor.

In the commercial manufacture and handling of almost any type of product, it is desirable to deliver the products to be processed in an orderly fashion into processing equipment. In the manufacture and processing of ear corn, it is highly desirable to place the ears transversely across a compartmented conveyor before inspection, husking, cutting, or the like. Also, it is often desirable to inspect the ears after size grading and before further processing steps.

An example of a known automated device for placing small, elongated objects on a conveyor is described in Grafius U.S. Pat. No. 4,462,508. The apparatus described includes a vibrating bowl having a base portion, a side wall and a ramp spiralling around the inner perimeter of the side wall such that the elongated objects are conveyed from the bottom end of the ramp along the upper surface of the ramp to a top end of the ramp. The bowl in the preferred embodiment makes pulsed movements which combine short counterclockwise displacement with a short upward displacement. Grafius, Col. 5, lines 26-29. As the objects move along the outside edge along the ramp, a long axis of the objects become aligned in a direction of travel of the objects and are deposited end-first into a chute. The chute drops the objects onto a notched spur gear having notches of a size sufficient to transversely receive the objects. As the spur gear rotates, the objects are deposited transversely onto a compartmented conveyor.

Other automated devices for handling objects are known. Horii U.S. Pat. No. 4,586,613 describes an apparatus for sorting fruits and vegetables by weight and by shape which includes a tiltable shallow bottomed tray conveyor including a plurality of trays. An electronic weight measuring unit is arranged below the travelling path of the trays. A planar shape-measuring device utilizing a photosensor is arranged above the tray and faces downward. A second photosensor is provided proximate the downward facing planar shape-measuring unit on one side of the tray conveyor path and perpendicularly to detect the height of an object on the tray. A portion of the conveyor path includes a distribution section having discharge operation units which are spaced at short intervals and are arranged to tilt each tray for sorting objects by grade and by rank. Receiving bins are provided for receiving the classes of objects distributed to them. The device is useful for sorting substantially spherical objects such as fruit.

Lapp et al. U.S. Pat. No. 4,771,894 describes a trough-like vibrating conveyor for sorting and separating two differently shaped components in a mixture. The mixture includes generally cylindrical shaped parts, and generally flat shaped parts. The conveyor includes two motors which are unbalanced, are arranged on opposite sides of the conveyor and are offset relative to each other. Near the discharge end of the conveyor is included a plurality of substantially horizontal rods having axes positioned in a general direction of travel of the components. The rods are provided to separate the flat and cylindrical particles exiting the conveyor from damaged particles or waste. The damaged and waste particles fall through the openings between the rods, while the flat and cylindrical particles remain on the rods. By selecting the degree of offset of the motors, the flat shaped articles follow a first path, exiting a first side of the exit end of the conveyor and the cylindrical particles follow a second path, exiting a second side of the exit end of the conveyor.

Another type of vibrating conveyor is described in Makino U.S. Pat. No. 4,040,303. That apparatus includes a first mass and a second mass. The first mass includes a vibration exciter of the rotary eccentric weight type and the second mass includes an object to be vibrated. The two masses are interconnected by resilient elements designed to permit a desired vibration amplification from the vibration exciter to the object to be vibrated. The device includes means for changing the operating frequency of the system to operate at a frequency near resonance level.

Rice et al. U.S. Pat. No. 3,139,184 discloses an apparatus for sorting objects by weight. The objects are fed by means of a conveyor into a weighing section of a moving belt. The weighing station generates a pneumatic pressure signal proportional to the weight of the object and the signal is transmitted through a conduit to a memory section. A booster generates an output signal proportional to the weight signal. The programmer, in response to the output signal of the booster operates two valves to permit the introduction of a new weight signal and to transmit the output signal from the booster to a sorting section. The sorting section includes an initial deflecting section which receives the weight signal and transmits an operating signal if the weight signal exceeds a predetermined value.

A device for deflecting the article off of the conveyor in response to the operating signal is provided. The deflecting device includes sorting sections having pneumatically operated pistons which actuate a sorting arm. The sorting arm meets the object and directs the object off the conveyor belt to a bin, chute, separate conveyor or the like.

Marmet U.S. Pat. No. 2,715,387 describes a device for separating chickens of a weight above a predetermined weight from the rest of the flock. The device includes top and bottom frame sections each being substantially rectangular in shape. Legs are connected between the corners of the frame sections. Arranged between each pair of legs and connected between the frame section are upright supports. Arranged forwardly of the frame structure are chicken receiving stalls secured to and extending forwardly from the upright supports at the front end of the frame structure. These stalls constitute passageways for directing or guiding a chicken toward a feed box or water trough. A lower portion of the receiving stall includes a chicken walk or treadle equipped with an actuating mechanism and a load cell. If the weight of the chicken exceeds a predetermined weight, a guard member is elevated to prevent the chicken from passing through the frame structure.

SUMMARY OF THE INVENTION

A device for placing elongated objects transversely onto a conveyor is disclosed. A preferred embodiment of the present invention feeds ears of corn, either with or without husks. The preferred device includes a vibratory feeder having an ear receiving surface adapted for causing the ears to align end to end and travel substantially single file in a plurality of lanes across the ear receiving surface. The preferred device also includes an eccentric conveyor positioned substantially transverse to the lanes and located proximate an exit end of the ear receiving surface. The device also includes a plurality of drop gates located proximate the eccentric conveyor on a side opposite the exit end of the ear receiving surface. The eccentric conveyor comprises a pair of shafts mounted for rotation transverse to the lanes. Mounted onto the shafts are a plurality of eccentric pulleys and sprockets.

The vibration of the feeder positions the ears on an upper surface of the eccentric pulleys which transfer the ears into the corresponding drop gate located in a line of travel of each lane. Means for actuating the drop gates are provided which allow the ears to fall onto a surface of a receiving conveyor located beneath the drop gates. Advantageously, the receiving conveyor moves in a direction substantially perpendicular to the direction of travel of the ears within the lanes, and the ears are placed substantially transversely onto the receiving conveyor where the ears can be visually inspected, cleaned, cut or husked, for example. In a preferred embodiment, the surface of the receiving conveyor which receives the ears is compartmented. The preferred device is capable of placing ears on a moving compartmented conveyor at rates up to about 440 ears per minute.

BRIEF DESCRIPTION OF THE DRAWINGS

FIG. 6 is a side elevational view of a preferred mechanism for controlling the operation of the drop gates of the present invention.

FIG. 7 is a top plan view illustrating a preferred mechanism for controlling the position of the drop gates of the present invention.

FIG. 9 is a top plan view of a portion of the pan, the eccentric conveyor and the receiving conveyor of a preferred embodiment of the present invention.

FIG. 10 is a top plan view of the portion of the pan, the eccentric conveyor and a receiving conveyor of a preferred embodiment of the present invention.

FIG. 11 is a top plan view of another embodiment of the present invention, including a retention device.

FIG. 12 is a side elevational view of a retention device of the present invention.

DETAILED DESCRIPTION OF THE PREFERRED EMBODIMENTS

Figure 1:
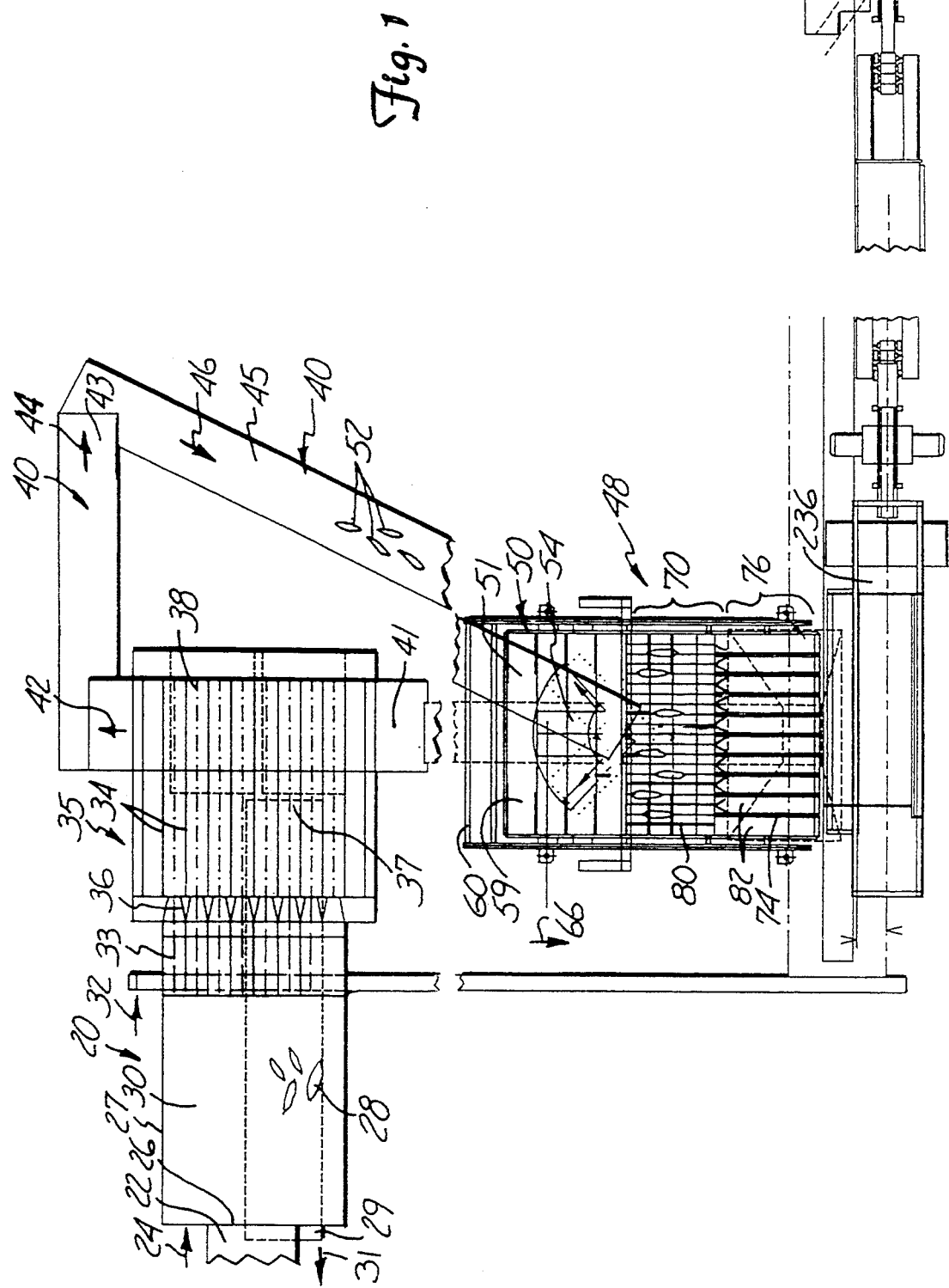
FIG. 1 is a top plan view of a corn feeding device of the present invention.

A device for placing elongated objects transversely onto a conveyor is disclosed. A first preferred embodiment is an ear corn feeder shown generally in FIG. 1. This first preferred embodiment is capable of receiving a stream of randomly placed ears of corn from a conveyor and placing the ears in spaced apart relationship transversely onto a receiving conveyor at speeds up to about 440 ears per minute. Advantageously, ear corn traveling with its longitudinal axis in a direction of travel moves at a maximum linear speed of about 50 feet per minute. The slower linear speeds allow for better control of the ears during feeding. In the preferred embodiment, the receiving conveyor is a rod conveyor having the rods placed transversely on four inch centers. The 440 ears per minute capacity translates to a receiving conveyor speed of up to about 146.7 feet per minute.

In a preferred embodiment, freshly picked corn ears are delivered to a size grader 35 by means of a belt-type supply conveyor 22 which is loaded from above at a feed end (not shown) in the preferred embodiment by means of a supply hopper (not shown). "Conveyor" for purposes of this disclosure is a belt-type conveyor having at least one flexible endless element driven by a plurality of rollers unless otherwise indicated. An example of a belt type conveyor suitable for conveying corn ears is available from Billington Welding of Modesto, Calif. In a preferred embodiment, the supply hopper (not shown) is filled by means of an end loader or dump truck. The conveyor 22 moves generally in the direction as shown by arrow 24. The conveyor 22 in a preferred embodiment is positioned on an incline. A discharge end 26 of the conveyor 22 delivers a plurality of ears of corn 28 to a vibratory feeder 20. The vibratory feeder of the preferred embodiment has a capacity of moving at least 440 ears per minute. The vibratory feeder 20 has an upper pan 27 which includes an upper surface having a substantially flat portion 30 and a corrugated portion 33. In a preferred embodiment, the corrugated portion 33 includes a plurality of valleys which are spaced on 8 inch centers. The corrugations are large enough to accommodate an ear of corn. In the preferred embodiment, the depth of the corrugations from a peak to a valley is about 3 inches.

In a preferred embodiment, the vibratory feeder 20 is substantially horizontal and is corrugated in a direction of travel 32 of the ears 28 such that when the ears exit the feeder 20, a centerline axis of each ear is aligned in a direction of travel as shown by arrow 32 upon entry into the size grader 35. The vibratory feeder 20 of the preferred embodiment is a 2 mass vibratory feeder available from Key Manufacturing of Milton-Freewater, Oreg.

The size grader 35 includes a plurality of elongated rods 34 which in the preferred embodiment are of a smaller spacing at a feed end 36 of the size grader than at a discharge end 38 of the size grader. The spacing between rods at the feed end are smaller than that at the discharge end. The described configuration functions to allow undersized ears to fall through the openings in the size grader 35 into a chute having a lower opening 37 (shown in phantom) proximate the feed end 36 which delivers undersized ears to a waste conveyor 29, which travels in the direction shown by arrow 31, located beneath the supply conveyor 22.

The spacing between the rods 34 allows the larger sized ears 28 to pass over the area which sorts out smaller ears and fall through the spaces between the rods 34 near the discharge end 38 onto an upper surface of a feed conveyor 40 located beneath the size grader 35. A cylindrical axis of each rod 34 of the size grader 35 lies on a plane which is positioned at a declining angle with respect to the horizontal such that the ears 28 fall from the feed end 36 toward the discharge end 38 by means of gravity. In a preferred embodiment, the size grader 35 is mounted onto a substantially stationary frame while the flat portion 30 and corrugated portion 33 of the upper pan 27 move at a selected frequency effective to convey the ears 28 in the direction of travel indicated by arrow 32.

In a preferred embodiment, an air cleaner (not shown) is located above the size grader 35 and blows air in a direction substantially normal to a plane containing a longitudinal axis of at least two of the rods 34. The air flow is sufficient to clear debris from the size grader 35.

In the preferred embodiment, the feed conveyor 40 has a first portion 41 traveling in a direction shown generally by arrow 42, a second portion 43 traveling in a direction shown generally by arrow 44, and a third portion 45 traveling in a direction shown generally by arrow 46. The first 41, second 43 and third 45 portions are collectively referred to as the feed conveyor 40. It is to be understood that the precise arrangement of the portions of the feed conveyor 40 is relatively unimportant. What is important is that a stream of ear corn 28 after size grading is delivered in a substantially constant stream to a delivery device 48 of the present invention.

Figure 2:
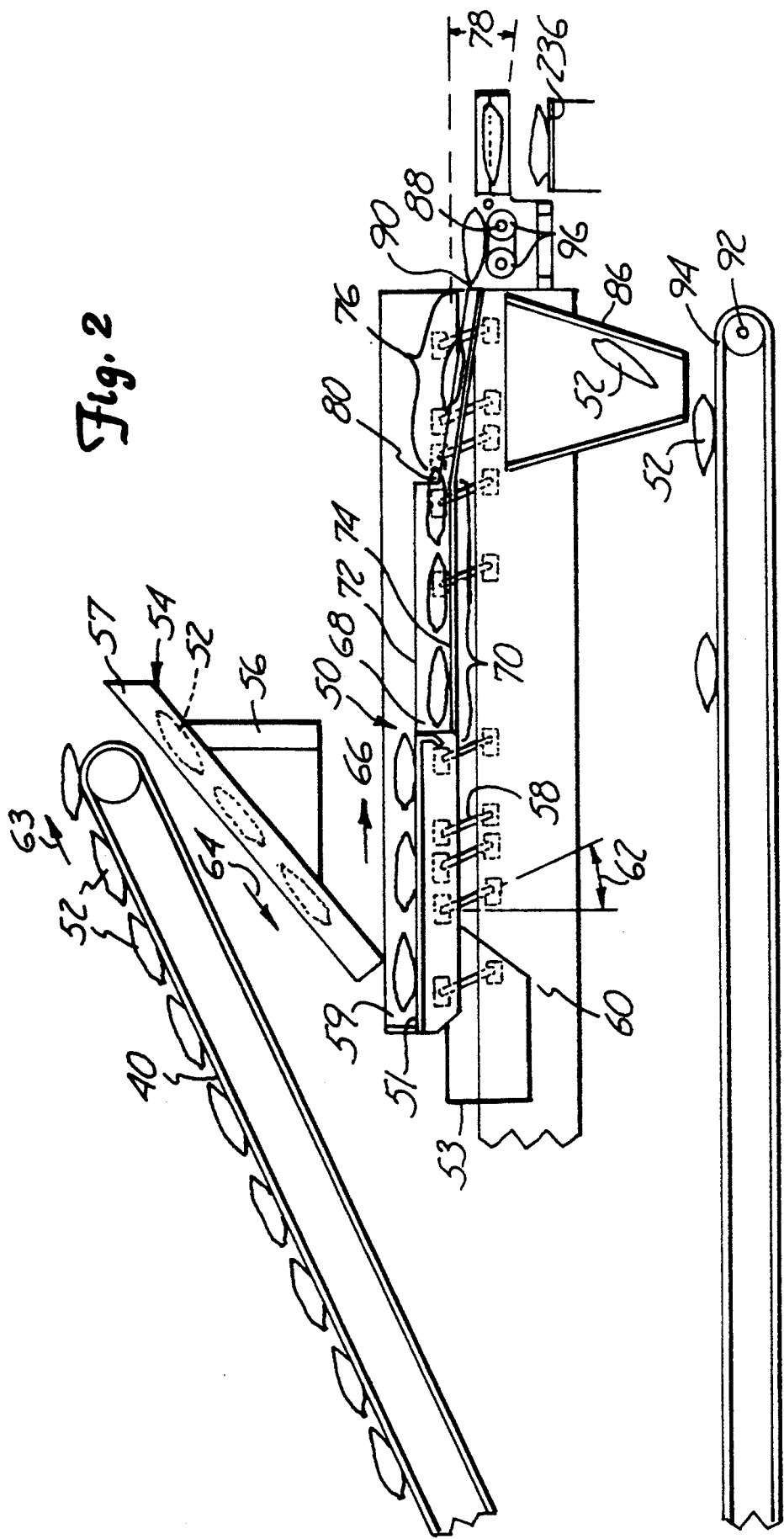
FIG. 2 is a side elevational view of a preferred embodiment of the present invention.

The delivery device 48 of a preferred embodiment includes a vibrating pan 50 which receives ears 52 from the feed conveyor 40 which in the preferred embodiment is inclining in the direction shown by arrow 46. The feed conveyor 40 deposits the ears 52 onto an upper end of a drop chute 54 which in a preferred embodiment is fixedly mounted onto a substantially vertical shaft 56 as shown in FIG. 2 which is mounted for pivotal rotation on a stationary frame (not shown). In a preferred embodiment, the drop chute 54 is pivotally mounted to an overhead frame (not shown) above the pan 50.

FIG. 2 shows a side elevational view of a preferred embodiment of the present invention. The drop chute 54 is formed of sheet metal such as 316 stainless steel sheet stock which has upwardly extending side walls 57 which prevent the escape of ears 52 from the sides of the chute and channels the ears 52 toward a feed end 59 of the vibrating pan 50. The drop chute 54 in a preferred embodiment includes means for limiting the degree of rotation of the drop chute 54 about a rotational axis of the shaft 56 such that all the deposited corn ears 52 are positioned proximate a feed end 59 of the vibrating pan 50.

In a preferred embodiment, a pneumatic actuator (not shown) is mounted to the shaft 56 and the chute 54, causing the chute 54 to rotate from side to side approximately 110°. The vibrating pan 50 in a preferred embodiment is mounted onto a plurality of resilient members 58 which permit vibration transfer from a vibration exciter (not shown) to the pan. The resilient members 58 are also mounted onto a stationary frame 60 of the vibrating pan in a preferred embodiment. The resilient members 58 in a preferred embodiment are springs which are mounted at an angle 62 with respect to the vertical which is about 15°. Angle 62 is selected such that articles of the size and weight to be moved travel generally in a direction indicated by arrow 66 when the vibrating pan 50 is in operation. Angles 62 between about 12° and about 15° are sufficient to convey objects such as corn ears.

In a preferred embodiment, the vibrating pan 50, and a two mass vibratory shaker 53 including the resilient members 58 and the stationary frame 60 are supplied as a unit and can be purchased from Key Manufacturing of Milton-Freewater, Oreg. by specifying a multi-lane "Nubbin" grader. It is also necessary to specify a selected pan shape which is described in detail below.

According to FIG. 2, the general direction of travel of the ears is in a first direction indicated by arrow 63 along the feed conveyor 40, and then in a direction indicated by arrow 64 through the drop chute 54. The ears 52 are delivered to a feed end 59 of the vibrating pan 50 which in the preferred embodiment has a substantially horizontal corrugated portion 70 and a declining section 76. The vibrating motion of the pan 50 moves the ears in a direction shown generally by arrow 66.

In an alternate embodiment, the size grader can be positioned above pan 50 such that conveyor 40 and drop chute 54 are not required.

In a preferred embodiment, the vibrating pan 50 has a first substantially flat and horizontal upper portion 51. As the ears 52 move generally in the direction of arrow 66 along the flat portion, the ears 52 approach a feed end 68 of the corrugated portion 70. The corrugated portion 70 in the preferred embodiment is substantially horizontal. The corrugated portion 70 includes a plurality of ridges 72 and valleys 74. In the preferred embodiment, an uppermost edge of the ridges 72 are at the same vertical elevation as the flat portion 51. The vibrating pan 50 of the present invention also includes a declining section 76 integrally formed with the flat portion 51 and the first corrugated portion 70.

In a preferred embodiment, the declining section includes a plurality of elongated "V" shaped troughs 84 extending from the valleys 74 of the corrugated portion 70 and are aligned in a direction of travel of the ears shown generally by arrow 66. The troughs 84 are spaced apart on 8 inch centers in a direction transverse to the valleys, and are about 2 inches wide. Since the average range of ear corn diameters is between about 1½ inches and about 3½ inches, the 2 inch trough width is sufficient to accommodate almost any variety of corn ears currently grown.

In a preferred embodiment, the declining section 76 declines from the horizontal at an angle 78 of about 2°. The angle 78 of decline is selected to accelerate the ears to about two to three times the approach velocity, which spreads apart the ears traveling substantially end-on-end in each of the troughs. The intersection of the corrugated portion 70 and the declining section 76 defines a ridge 80 in a pan of a preferred embodiment. The ears 52 pass from the corrugated portion 70 onto the declining section 76 as the pan 50 vibrates. In the corrugated portion 70, the vibratory motion due to the motor (not shown) and resilient members 58 cause the ears 52 to move in the direction shown by arrow 66. In the declining section 76, the ears 52 move by a combination of propulsion from the drive means of the vibratory device (not shown) and in part by means of gravity.

In the preferred embodiment, the flat portion 51, the corrugated portion 70 and the declining section 76 define the pan 50 and are integrally formed of stainless steel sheet stock.

The present invention is preferably a two mass vibratory system including a drive motor (not shown) which causes the vibrating pan 50 to vibrate in a manner which propels the ears 52 in a direction shown by arrow 66.

Referring back to FIG. 1, in a preferred embodiment, the declining section 76 includes a plurality of openings 82 and the narrow troughs 84 are just wide enough to support an ear of corn traveling substantially in the direction shown by arrow 66. In a preferred embodiment, the troughs 84 are about 2 inches wide. If any ears are not aligned over the narrow troughs 84, the ears fall through the openings 82 in the declining section 76 and are received below in a recycle hopper 86 as shown in FIG. 2. The presence of the openings 82 and the positioning of the recycle hopper 86 prevent the narrow troughs 84 from delivering more ears to a discharge end 90 of the declining section 76 than can be moved away by means of an eccentric conveyor 88 of the present invention positioned proximate the discharge end 90.

In a preferred embodiment, a single cross brace (not shown) extends across a lower surface of each narrow trough 84 proximate the discharge end 90 for minimizing vibration of the type which is not useful in moving the ears in the desired direction. A preferred brace includes an elongated strip of round or rectangular metal sheet stock.

The recycle hopper 86 in the preferred embodiment extends substantially downwardly and tapers inwardly to deposit the ears 52 onto a recycle conveyor 92. In the preferred embodiment, the recycle conveyor 92 comprises a conventional endless moving belt 94 which delivers the overflow ears 52 back proximate a feed end of the feed conveyor 40. Alternatively, the recycle conveyor 92 sends the recycled ears 52 back through the size grader 35 (shown in FIG. 1). In yet another embodiment, the recycled ears 52 are fed directly onto the drop chute 54.

The present invention includes means for controlling the rate of feed of the ears 52 to the delivery device 48 of the present invention. A preferred means includes providing an optical sensor for measuring a height of ears present on the recycle conveyor. The optical sensor in response to a visual observation generates a signal which is received by a controller (not shown). The controller shuts off the supply conveyor 22 until the optical scanner senses that the height of the recycled ears has been reduced, or eliminated.

The precise means of control is not critical due to the capacity of the preferred embodiment to recycle excess ears, and avoid plugging up the machine. Other preferred methods of controlling the feed rate include collecting recycled ears into a hopper, and sensing the level in the hopper. When the hopper is full, the controller turns off the conveyor 22 and turns on a recycle return conveyor (not show) which empties the contents of the recycle hopper onto the feed conveyor 40. The present invention is not limited to the above described means of controlling the rate of feed of the ears into the delivery device 48.

In another embodiment, the declining section 76 is replaced by a plurality of declining chain conveyors which convey the ears 52 from the corrugated portion 70 to the eccentric conveyor 88 of the present invention by means of frictional contact between the husks and the chains.

Figure 3:
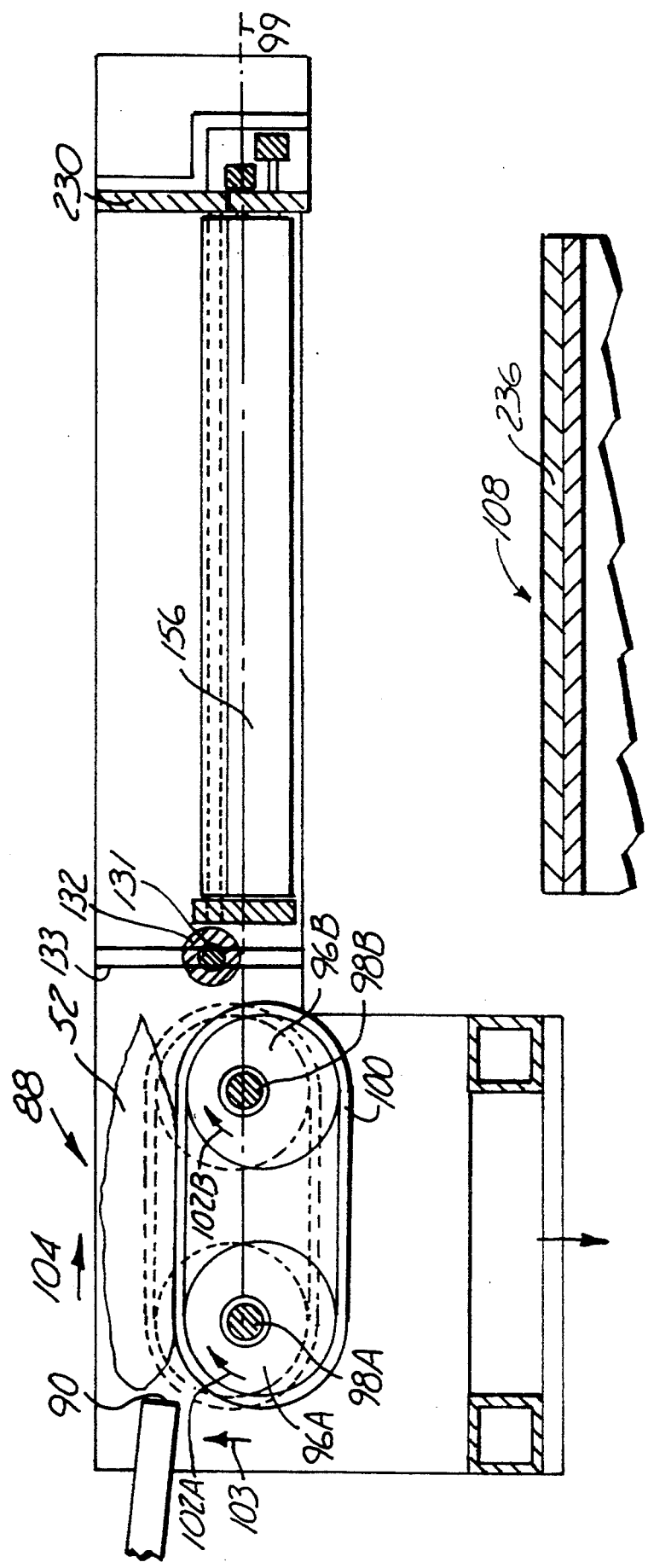
FIG. 3 is a side elevational view of a first preferred eccentric conveyor of the present invention.
Figure 3A:
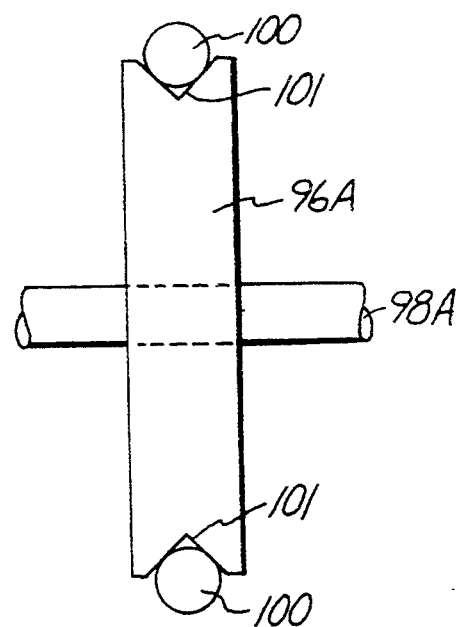

Referring now to FIG. 3, the present invention includes means for delivering the ears moving through the troughs 84 into a means for dropping the ears onto a receiving conveyor. In a preferred embodiment, the means for delivering the ears includes an eccentric conveyor 88. The eccentric conveyor 88 includes a plurality of eccentric pulleys 96A and 96B which are fixedly mounted in pairs in the preferred embodiment onto rotatable shafts 98A and 98B respectively. Each pair of pulleys is closely spaced to accept a lower surface of an ear 52. In the preferred embodiment, a center to center distance between pulleys is about 1½ inches. The eccentric conveyor 88 also includes a plurality of endless moving members 100 mounted within a groove 101 (shown in cross section in FIG. 3A) on the outer surfaces of eccentric pulleys 96A and 96B. In a preferred embodiment, the endless moving member 100 is a flexible belt. The outer diameter of each eccentric pulley in a preferred embodiment is approximately 4.625 inches, and the pulleys have an approximate 4.500 pitch diameter.

Referring back to FIG. 3, in the preferred embodiment, the shafts 98A and 98B are substantially solid, have central shaft axes which lie within a horizontal plane 99 (into the paper) and have a one inch nominal outside diameter. The eccentric pulleys 96A and 96B of the preferred embodiment have an approximate 1 inch diameter bores extending therethrough which are each identically offset from a center point by about 0.500 inches. In a preferred embodiment, the shafts 98A and 98B are stationary relative to the bore in each eccentric pulley 96A and 96B. The pulleys are locked into place on the shafts in the preferred embodiment.

Because the eccentric pulleys 96A and 96B rotate about an axis which is not located centrally on the pulley, the eccentric pulleys have a "lower" position shown in solid lines and an upper position shown in phantom. In the preferred embodiment, both eccentric pulleys 96A and 96B are in the same phase during rotation. For purposes of this disclosure, "in phase" means that the eccentric pulleys 96A and 96B reach their maximum vertical height at the same time and also meet their minimum vertical height at the same time.

A vertical height of the lowest point of the troughs 84 at the discharge end 90 in the preferred embodiment is approximately one half inch below a vertical height of an upper surface of the endless moving member 100 when the eccentric pulleys 96A and 96B are at their minimum height (shown in solid lines). With this geometry, the majority of each ear moves off of the troughs 84 and becomes positioned directly over the eccentric pulleys 96A and 96B as shown in FIG. 3 due to vibratory movement. Although the preferred height difference is about plus one half inch, the distance can vary plus or minus about one half of an inch, depending on the geometry and surface smoothness of the ears.

In order to process a wide variety of corn, the present invention includes means for adjusting the height of the eccentric conveyor 88 relative to a valley of the troughs 84. The preferred means includes mounting the eccentric conveyor on a frame which has a height adjustment.

Both eccentric pulleys 96A and 96B travel in a direction of rotation shown by arrows 102A and 102B. As the eccentric pulleys 96A and 96B rotate in direction 102A and 102B, an upper surface of the endless moving member 100 moves both vertically in a direction shown by arrow 103 and horizontally in a direction shown by arrow 104 which lifts the ear 52 and accelerates the ear into a drop gate 156 located on the opposite side of the eccentric pulley 96B. The combination of rotational motion as well as acceleration in the directions 103 and 104 has the effect of increasing the gravitational forces on the ear 52 and allows the eccentric conveyor 88 to convey the ear 52 in to the drop gate 156 without additional means of propulsion. Once positioned in the drop gate 156, the ear 52 may be dropped onto an upper surface of a receiving conveyor 108 located beneath the drop gate 156 as will be described below.

Figure 4:
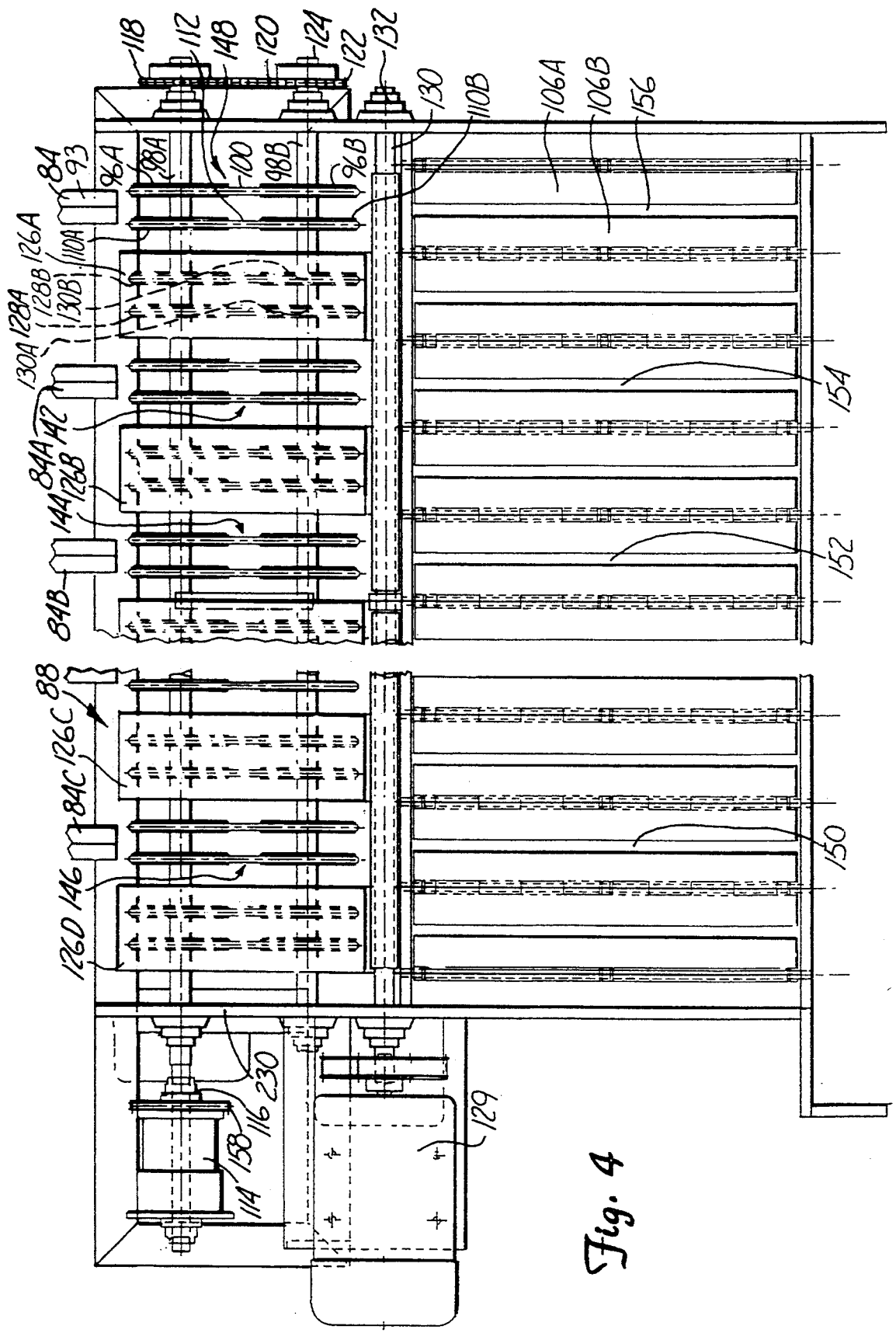
FIG. 4 is a top plan view of an eccentric conveyor and drop gates of the present invention.

Referring to FIG. 4, each narrow trough 84, 84A, 84B and 84C, for example 84, positions an ear between a pair of two closely spaced eccentric pulleys 96A and 110A. In the preferred embodiment, the pulleys 96A and 110A are spaced apart by 1½ inches from center to center. The second pair of eccentric pulleys 96B and 110B in the preferred embodiment are substantially identical to the construction of pulleys 96A and 110A. That is, all four eccentric pulleys 96A, 96B, 110A and 110B are fixedly mounted onto their respective shafts 98A and 98B and all four eccentric pulleys 96A, 96B, 110A and 110B have on their outer surfaces a notch for receiving an endless moving member 100 and 112, respectively. The second set of pulleys 96B and 110B are aligned with the first set 96A and 110A and a centerline of the trough 84. A set of four eccentric pulleys 142, 144 and 146 are positioned in similar fashion proximate each additional trough 84A, 84B, 84C and so forth.

In the preferred embodiment, 20 sets of two eccentric pulleys each are mounted onto shaft 98A and 20 sets of two eccentric pulleys each are mounted onto shaft 98B. The total number of eccentric pulleys therefore is 80. However, eleven sets are covered since only nine lanes are used. The total number of operational pulleys is therefore 36. In the preferred embodiment, two closely spaced pulleys per cob per shaft are used to straddle the ear and provide stability. In another embodiment, a wider pulley having a V-shaped notch on its outer circumferencial surface would be an acceptable substitute for a pair of adjacent pulleys. In yet another embodiment, four pulleys per lane substantially identical to the first preferred embodiment except without belts can be used with some varieties of corn.

Only every other set of eccentric pulleys 142, 144 and 146 in the preferred embodiment are used while the remaining sets (of four each) are covered by shield members 126A, 126B, 126C and 126D. In the preferred embodiment, the shield members 126A through 126D are formed from substantially flat sheet stock material having 90° bends near each end forming a cap over each set of four unused eccentric pulleys such as a set defined by pulleys 128A, 128B, 130A and 130B, for example. It is to be understood that since according to the first preferred embodiment, only alternating sets of four eccentric pulleys are used to practice the present invention, placing the additional unused eccentric pulleys on the shafts 98A and 98B is not necessary. An alternate embodiment uses all twenty lanes with no ear recycling feature.

In a preferred embodiment, the first shaft 98A is driven by means of a motor (not shown) attached to the frame 230. An electric clutch 114 is provided and is chain driven by the motor (not shown). The clutch 114 allows the motor to rotate substantially continuously. The clutch 114 is connected to the shaft 98A by means of a coupling 116. A controller (not shown) sends a signal to the clutch 114 to engage the motor for a time sufficient to allow the shaft 98A to rotate one complete revolution per cycle. A timer is provided which sends a signal to the controller that a cycle is complete. The controller then signals the clutch to engage the motor to begin another cycle. Only one revolution is required to move an ear of corn 52 from a position substantially above the eccentric pulleys 96A, 110A, 96B and 110B into a corresponding drop gate 156.

The clutch 114 in the preferred embodiment is a Warner single revolution clutch no. CB-8 and is available by ordering part no. CB-8-F-CCW from the Warner Corporation of S. Beloit, Ill. The preferred clutch has a one and one half inch bore and runs on 120 AC, 60 cycle power.

The shaft 98A is mounted for rotation on a stationary frame 230 by means of bearings (not shown). Mounted onto an end of the shaft 98A opposite the motor end is a sprocket 118 for receiving an endless timing chain 120. The endless timing chain 120 meshes with a second sprocket 122 located proximate a first end 124 of the second shaft 98B which is similarly mounted for rotation within the stationary frame 230 by means of bearings (not shown). The preferred sprockets 122 and 118 are of the same size such that shafts 98A and 98B rotate at substantially the identical rotational speeds which in the preferred embodiment is about 85 r.p.m. Both sprockets are: Martin sprocket nos. 40BTL22H with 1610 pound bushings and 1 inch bores. Since in the preferred embodiment the sprockets 118 and 122 are of the same diameter, the speed of the shaft 98B rotates at substantially the same speed as shaft 98A.

In the preferred embodiment, the controller (not shown) sends a signal to the clutch 114 which engages the motor (not shown) for an amount of time sufficient to cause each eccentric pulley mounted on shafts 98A and 98B to rotate one revolution. The controller is programmed to cause the clutch 114 to repeat the sequence approximately every 1.45 seconds at a feed rate of about 400 ears per minute in the preferred embodiment. In the preferred embodiment, the motor (not shown) is a gearmotor manufactured by Shimpo Corporation of Japan. The motor has a circulate reducer. The motor may be ordered from the Baldor Corporation of Fort Smith, Ark. by specifying part no. 61B17-140TC and requesting a Baldor 145 TC frame, one and one-half horse power 230/460/3 V, 60 cycle T.E.N.V., 1750 r.p.m. washed-down duty motor. The preferred reducer and drive chain reduces from 1750 r.p.m. motor speed to 85 r.p.m. shaft speed in the preferred embodiment.

In a preferred embodiment, the motor (not shown) which drives the shaft 98A has an output shaft onto which is mounted a sprocket (not shown). Mounted onto the clutch 114 is a second sprocket 158. Sprocket 158 and the sprocket of the motor shaft (not shown) are connected by means of an endless chain (not shown). In the preferred embodiment, both sprockets 158 and the sprocket mounted onto the output shaft of the motor (not shown) are Martin sprockets no. 40BTL22H with 1610 pound bushings and 1 inch bores. According to the preferred embodiment, the rotational speed of the motor shaft is reduced by a gear reducer and chain connected to the motor (not shown) to achieve a shaft 98A speed of about 85 r.p.m.

The combination of the endless moving members 100 and 112 coupled with the drive configuration described above assures that each eccentric pulley will move at substantially the same rotational speed and that each eccentric pulley will rotate in phase with the other eccentric pulleys. In other words, each eccentric pulley according to a preferred embodiment, reaches its maximum "upper" position at precisely the same time while each eccentric pulley will reach its minimum "lower" position at precisely the same time. The preferred height increase from "lower" to "upper" positions is about 1 inch.

In a preferred embodiment, a drop gate 156 includes a pair of substantially rectangular leafs 106A and 106B whose inner edges in a first "closed" position are substantially parallel to and proximate a center of the trough 84 such that when the ear is transferred from the eccentric conveyor 88 to the drop gate, the ear is positioned substantially centrally in the closed drop gate 156. In a preferred embodiment, each of the narrow troughs 84 includes a valley 93 which is spaced about 8 inches apart from each adjacent valley. In a preferred embodiment, the pan 50 includes 9 troughs 84.

In a preferred embodiment, the controller holds the drop gates 150, 152, 154 and 156 in a first "closed" position while the clutch 114 engages the motor and drives the eccentric conveyor 88 to place ears in the drop gates.

In the preferred embodiment, the motor (not shown) rotates the shafts 98A and 98B at speeds sufficient to obtain a surface velocity on a horizontal portion of the endless moving member 100 of between about 80 and about 120 feet per minute with a preferred speed of about 100 feet per minute.

Referring back to FIG. 3, in a preferred embodiment, a rotating spinner bar 132 provides an additional means for moving the ears from the pan 50 to the drop gates 156. A preferred spinner bar 132 is fixedly mounted onto a shaft 131, the shaft being mounted for rotation on the stationary frame 230 between the drop gates 150, 152, 154 and 156 and the eccentric conveyor 88 (shown in FIG. 4). As shown in FIG. 3, the spinner bar 132 is a rubber tube having a through-bore of a size to snugly receive the shaft 131. In another embodiment, the shaft 131 has a larger diameter portion defining the spinner bar 132 and is of a substantially solid construction. In the preferred embodiment, the shaft 131 is of about a 1 inch outside diameter, and the spinner bar is of approximately 1½ inches outside diameter. The spinner bar 132 spins at a substantially constant rate of approximately 250 feet per minute surface speed. The spinner bar 132 according to the preferred embodiment is driven by a motor 129 (shown in FIG. 4) which in the preferred embodiment is a Baldor one-half horse power foot mounted Baldor motor having a 230/460/3 V/60 cycle, no. 56 frame TENV rated motor which operates at 1750 r.p.m. This motor may be obtained by ordering part no. WDN3538 from the Baldor Corporation of Fort Smith, Ark.

In a preferred embodiment, an upper surface of the spinner bar 132 is at substantially the same vertical height as the upper surface of the endless moving member 100 when the eccentric pulleys 96A and 96B are in their "upper" position (shown in phantom). When the ear 52 passes over the spinner bar 132, the additional surface speed of the spinner bar 132 assures that the ear 52 will move completely off the eccentric conveyor and into the drop gate 156. Although a preferred embodiment of the present invention includes a spinner bar, it is to be understood that the eccentric pulleys 96A and 96B generally provide enough momentum to the ear 52 such that the ear reaches the drop gate without further assistance. In a first preferred embodiment, the spinner bar 132 is mounted onto the same adjustable frame which supports the eccentric conveyor 88. Further height adjustment 133 is also provided so that the maximum height of an upper surface of the spinner bar 132 is at a same height as the maximum height of the eccentric pulleys, and the minimum height of an upper surface is approximately at the same height as the minimum height of the eccentric pulleys.

Figure 5:
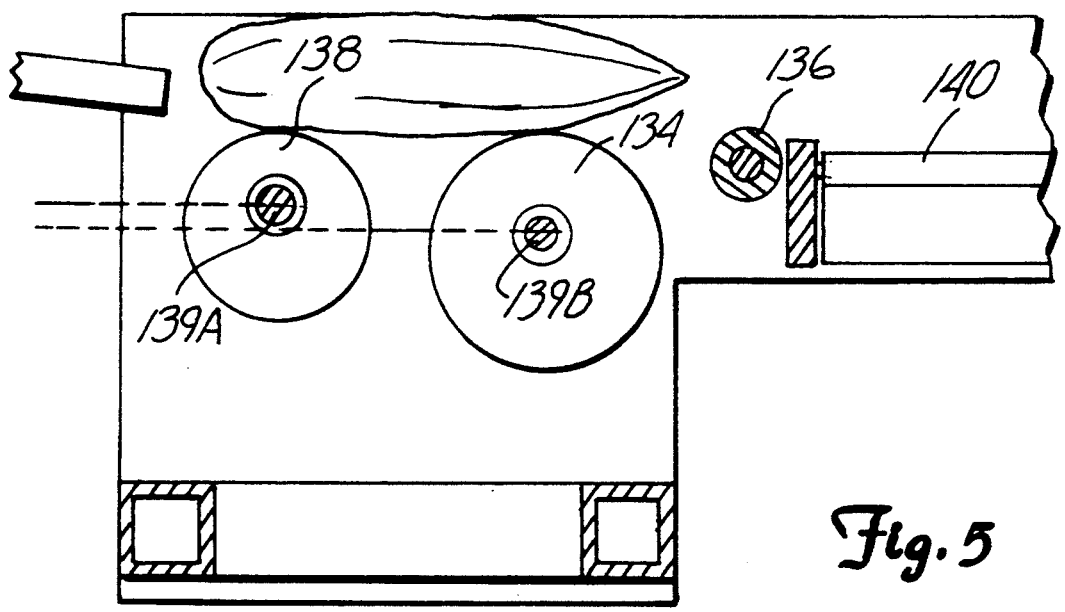
FIG. 5 is a side elevational view of a second preferred eccentric conveyor of the present invention.

FIG. 5 shows a side elevational view of a second preferred eccentric conveyor of the present invention. In a second preferred embodiment, the eccentric pulley 134 located proximate the spinner bar 136 is of a diameter which is larger than the diameter of the eccentric pulley 138. The shafts 139A and 139B have central rotational axes which are within separate planes, where the shaft 139B closest to the spinner bar is positioned about ½ inch lower than the shaft 139A. In this case, as with a first preferred embodiment, both eccentric pulleys 134 and 138 travel at the same rotational speed and reach a maximum vertical height at precisely the same time. It is believed that the eccentric pulley 134 closest to the spinner bar 136 can be up to 100% larger in circumference than the eccentric pulley 96A (shown in FIG. 3) and adequately accelerate the ear 52 into the corresponding drop gate 156 without a spinner bar.

In a third preferred embodiment, the eccentric pulleys are of the same size and alone provide enough frictional contact between the outer surfaces of the eccentric pulleys and the ear corn such that a belt is not necessary. In such a case, the use of a metal eccentric pulley may be sufficient to accelerate the ears. It might also be desirable to provide a knurled or rubber coated outer circumferencial surfaces on the pulleys to improve frictional contact between the pulleys and the ear if necessary to process some varieties of corn.

Referring back to FIG. 4, a valley 93 of each narrow trough 84, 84A, 84B and 84C defines a line of travel of each lane of ears. As each ear is accelerated toward a drop gate 156, for example, comprising a first leaf 106A and a second leaf 106B, the leafs 106A and 106B suspend the ear directly above a receiving conveyor 108 below (shown in FIG. 3). In operation, each set of eccentric pulleys, each set being defined by four pulleys 96A, 96B, 110A and 110B, and additional sets 142, 144 and 146, for example, respectively transfer in a single revolution of the shafts 98A and 98B an ear to each corresponding lift gate 150, 152, 154 and 156 located along the lines of travel of the ears.

Because every other set of four eccentric pulleys remain unused according to a preferred embodiment, the drop gates located in a line of travel of the covered pulleys are not used in the operation of this embodiment. It was surprisingly discovered that by selecting an 8 inch center to center spacing between valleys 93 in the declining section 76, that enough space between valleys became available to recycle ears and avoid plugging and jamming at the eccentrics during operation. The vibrating pan was modified to include 9 lanes rather than the original 20 and the improved version is what is shown in FIG. 1. As a result of the pan modification, it became desirable to cover unused eccentric pulleys and disable the unused drop gates.

Referring to FIG. 6, a side elevational view of a plurality of drop gates 159, 160, 162, 164, 168 and 170 are shown. In the preferred embodiment, each drop gate, for example gate 168, comprises a first leaf 172 and a second leaf 174. Each leaf 172 and 174 is hinge mounted onto a substantially horizontal drop gate shaft 176F and 176G having a substantially horizontal axis 218 (shown in FIG. 7).

Each alternating drop gate 160, 164 and 168 in the preferred embodiment has a first closed position as shown in FIG. 6 and a second open position 169A and 169B (shown in phantom) in which adjacent leafs 172 and 174 pivot downwardly in a direction shown by arrows 178 and 180 along a central axis of each shaft 176F and 176G. In a preferred embodiment, the adjacent leafs defining a drop gate move substantially in unison in opposite directions. In the first closed position as illustrated in FIG. 6, the spacing between the lowermost edges of adjacent leafs 172 and 174 is about ½ inch. The spacing in the first closed position in the preferred embodiment is at least about ½ inch in order to avoid operator pinch points or jamming the machine if an ear becomes lodged between the leafs 172 and 174 while the leafs are returning to the closed position.

The drop gates 160, 164 and 168 of the preferred embodiment also have a second open position which is reached when the leafs 172 and 174 rotate in the direction shown by arrows 178 and 180 respectively. The adjacent edges of the leafs 172 and 174 open to a width of at least approximately 3½ inches in the preferred embodiment to allow the ears to fall freely.

Every other adjacent leaf, for example, leafs 172 and 173 in the preferred embodiment includes a piano-type hinge proximate an upper edge, each hinge being mounted onto a substantially solid drop gate shaft 176F as described above. In the preferred embodiment, each drop gate shaft is formed of ⅜ inch round stock.

Referring back to FIG. 3, it can be seen that the elevation of the uppermost portion of each drop gate is about the same as the elevation of endless members 100 when the eccentric pulleys 96A and 96B are in their lowermost position. Although this is a preferred configuration, the height of the uppermost portion of each drop gate as compared to the height of the eccentric conveyor 88 is not critical.

Referring back to FIG. 6, in a preferred embodiment, actuation means comprising a plurality of pneumatic cylinders 182 and 184 (shown in FIG. 7) together operate to move leafs 181, 179, 177, 175, 172 and 174 respectively from a first closed position to a second open position. To open the gates, the pneumatic cylinders 182 and 184 are activated, causing leafs 181, 177 and 172 rotate in a first direction as shown by arrow 178, and leafs 179, 175 and 174 rotate in a direction shown by arrow 180. To close the gates, the actuators return to the original position and the direction of rotation of the gates reverses.

In the preferred embodiment, since only nine lanes are used in the delivery device 48 (shown in FIG. 1), only nine gates are actuated by the described actuation means. The gates which are not actuated by means of the pneumatic cylinders 182 and 184 remain closed.

In another preferred embodiment, the delivery device 48 has a corrugated section having corrugations on 4 inch centers. The declining section includes twenty narrow troughs, and the eccentric conveyor includes 80 eccentric pulleys, forming twenty lanes. In this embodiment, all of the drop gates are actuated by the means described above. That is, each leaf is pivotally connected to a pneumatically actuated linking arm.

The pneumatic cylinders 182 and 184 (shown in FIG. 7) are operated at a rate which in the preferred embodiment opens the leafs 181 and 179, 175 and 177 and 172 and 174 faster than the ear is capable of dropping by means of gravity and therefore the ears fall freely without spinning onto an upper surface of the receiving conveyor 108 (shown in FIG. 3) below. In the first preferred embodiment, the ears fall a distance of about six inches from the drop gate to an upper surface of the conveyor 108.

FIG. 7 is a top plan view illustrating a preferred means of actuating the drop gates of the present invention. A preferred means of actuating the drop gates of the present invention opens and closes alternating drop gates by means of a pair of pneumatic cylinders 182 and 184. The remaining drop gates remain stationary. A first set of leafs 203, 201, 199, 186, 190, 194 and 198 are each pivotally connected to a first linking arm 200 by pivot pins 187A through 187G. The first linking arm 200 is pivotally connected at one end to the pneumatic cylinder 182 and is pivotally connected at the opposite end to pneumatic cylinder 184. A second set of leafs 206, 210, 214, 221, 223, 225 and 235 are pivotally connected to a second linking arm 202 by pivot pins 215A through 215G. The second linking arm 202 is also pivotally connected to each pneumatic cylinder 182 and 184. Leafs 188, 192, 196, 204, 207, 208, 209, 213, 212 and 216 are not pivotally connected to either linking arm and remain stationary in a first preferred embodiment.

The pneumatic cylinders 182 and 184 in the first preferred embodiment are supported by the linking arms 200 and 202 which in turn are supported by the pivot pins 215A–215G and pivot pins 187A–187G. First ends 241 and 243 of the linking arms 200 and 202 are free.

The means to actuate the drop gate also includes a crank arm 239 to allow the linking arms 200 and 202 to move in the horizontal as well as in the vertical direction. Crank arm 239 is mounted to the stationary frame 230 and connects the frame to the opposite ends 226 and 228 of the linking arms 200 and 202.

The crank arm 239 includes a center pivot pin 237. The pivot pin 237 is mounted for rotation onto the frame 230. Pivotally connected to the pivot pin is a control arm 219. At one end of the control arm, a pivot pin 231 is provided for pivotally connecting the control arm to a first end of linking arm 232. At an opposite end of the control arm 219, a pivot pin 233 is provided for pivotally connecting the control arm to a first end of linking arm 234. The second end of linking arm 232 is pivotally connected to the opposite end 228 of linking arm 200 by means of pivot pin 229. The second end of linking arm 234 is pivotally connected to the opposite end 226 of linking arm 202 by means of a pivot pin 227.

In operation, the pneumatic cylinders move the linking arms 200 and 202 in a direction indicated by arrow 205, and in a direction opposite the direction shown by arrow 205. During operation, the linking arms 200 and 202 remain substantially horizontal, yet move in the vertical direction enough to allow the leafs to move in an arc.

In the preferred embodiment, twenty drop gates are provided for dropping corn onto a conveyor beneath the drop gates. However, as mentioned above, only 9 gates are operational. Alternating gates according to the first preferred embodiment are not connected to linking arms 200 and 202. Pneumatic cylinders 182 and 184 operate each of the 9 pairs of operational gates.

Each of the drop gate shafts 176A through 176G (shown in FIG. 6) are pivotally mounted to the frame 230 which holds the entire drop gate assembly suspended above the receiving conveyor 108 (shown in FIG. 3).

Referring back to FIG. 3, in the preferred embodiment, the conveyor 108 is a rod-type conveyor defined by a plurality of transversely extending rods (not shown) which are stationary in relation to the endless moving belt 236. In the preferred embodiment, the transversely mounted rods are spaced apart on 4 inch centers and are suspended about 1½ inches from an upper surface of the moving belt 236. The rods and upper surface of the belt define compartments which are of a size to individually receive a single ear of corn falling from a drop gate above. Although a preferred receiving conveyor 108 comprises a rod-type conveyor, it is to be understood that any compartmentalized surface suitable for receiving an elongated object transverse to a direction of motion of the conveyor would be suitable for receiving elongated objects such as corn ears. For example, the present invention includes a compartmentalized conveyor of the type shown in FIG. 8.

Figure 8:
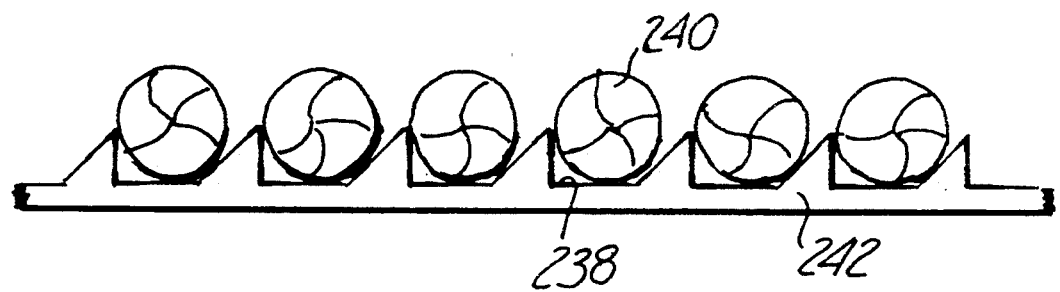
FIG. 8 is a side elevational view of a second preferred receiving conveyor of the present invention.

FIG. 8 is a schematic side elevational view of another preferred receiving conveyor of the present invention. A quantity of trough-shaped notches 238 extend transversely across a surface of the conveyor and are of a suitable size and shape for receiving an ear of corn 240. In this embodiment, the endless belt 242 includes integrally formed compartments.

In a preferred embodiment, one or more optical sensors are mounted above the receiving conveyor 108 (shown in FIG. 3) and are provided to sense the position of the rods on the conveyor relative to the drop gates. The optical sensor observes when a rod passes the sensing device and sends a signal to the controller. The controller activates a timing device which generates a signal when a selected time has past. The controller then activates the pneumatic cylinders 182 and 184 (shown in FIG. 4) to open the gates and drop each ear centrally into alternating compartments on the conveyor as shown in FIG. 9.

FIG. 9 is a top plan view of the declining section 76, the eccentric conveyor 88 and a receiving conveyor 108 of the present invention. In operation, ears of corn 244 travel along the valleys of the corrugated portion 70 and across the narrow troughs 84 of the declining section 76 where some ears become dislodged and fall into the recycle chute 86. The ears that remain on the narrow troughs 84 travel onto an upper surface of the eccentric conveyor 88 by means of the delivery device 48 and by means of gravity and are transferred onto the drop gate section 150, 152, 154 and 156 which has been removed from FIG. 9 for clarity (shown in FIG. 4). As the first set of ears (indicated by numeral 1) are placed on the closed drop gates, the optical sensor (not shown) below scans for the presence of the transversely mounted rod on the rod conveyor below. The rod conveyor 108 in the preferred embodiment moves substantially continuously in a preferred embodiment at a linear speed of about 133.3 feet per minute. When the sensor determines that the ears shown as reference numeral 1 will be centered between the rods after the ear freely falls to the surface of the rod conveyor 108, the controller (not shown) activates the pneumatic cylinders 182 and 184 to rapidly open the gates and deposit the ears identified by the numeral 1 in alternating compartments on the rod conveyor 108.

According to a preferred embodiment, the rod conveyor 108 moves continuously while the eccentric conveyor 88 intermittently loads the drop gates. Referring now to FIG. 10, as the first series of ears located on the receiving conveyor 108 advance approximately half way past the eccentric conveyor, which in the preferred embodiment is nine ear spaces, a second series of ears indicated by numeral 2 is loaded into the drop gates (which are removed from this drawing for purposes of illustration). It is to be understood that the timing of each revolution of the eccentric conveyor 88 allows sufficient time for the receiving conveyor 108 to advance 9 spaces according to a preferred embodiment. While the receiving conveyor 108 is moving in a direction as shown generally by arrow 245, a second group of ears, marked as number 2 in the drawings, is loaded into the drop gates which are removed from this figure for purposes of illustration. The controller is programmed to reactivate the pneumatic cylinders after the photosensor sends the ninth signal. After a selected time delay, the control device actuates the pneumatic cylinders 182 and 184, (shown in FIG. 7) dropping the second set of ears on the receiving conveyor below. It can be seen from FIG. 10 that by advancing the receiving conveyor 108 a total of 9 compartments between each drop, that the conveyor will eventually be substantially filled with transversely positioned ears in nearly every compartment. In practice however, it has been found that an upper practical limit on the percent filled compartments is about 70% when a twenty lane feeding device is used. When using the lanes is possible and therefore the ears must be fed at a slower rate to prevent pluggage. Greater fill rates can result in jamming at the eccentric conveyor. When nine lanes according to the first preferred embodiment are used and a portion of the ears can be recycled, then fill rates up to 95% are possible and have been achieved.

It has been surprisingly discovered that by loading ears onto a conveyor in a manner which positions the ears substantially transversely across the receiving conveyor 36, that greater production speeds have been attained that were not possible prior to the present invention. The device described above is capable of delivering up to about 440 ears per minute to the receiving conveyor 108 and at the same time positioning each ear transversely across the conveyor receiving surface into individual compartments.

The gates of the preferred embodiment should be at least about 18 inches in overall length when processing corn to accommodate a cob which can be up to about 12 inches in length plus 2 to 3 inches for the cob stock and 2 to 3 inches for the husks and silks.

FIG. 11 shows another preferred feeding device 246 of the present invention. The feeding device 246 includes a vibratory pan 248 including a flat section 250, a corrugated section 252 and a declining section 254 defined by a plurality of downwardly sloping narrow troughs 256. The pan 248 is substantially identical to what is described in the first preferred embodiment. Below the feeding device 246 is a recycle chute 258.

A retention device 260 is provided for spreading apart the ears within the troughs 256. The retention device includes a pivotally mounted shaft 262 which in the preferred embodiment is mounted in bearings 264. The bearings are mounted on a stationary frame 266. Mounted on the shaft 262 is a rubber strip 268 which extends downwardly toward an upper surface of the troughs 256, and is long enough to prevent ears from passing under a lower edge 270 of the strip 268 (shown in FIG. 12). A crank arm 272 is mounted onto an end 274 of the shaft 262. The crank arm is pivotally mounted to a pneumatic actuator 276 and upon delivery of fluid pressure, rotates the shaft 262 and strip 268 (shown in broken lines) in a direction indicated by arrow 278 enough to allow an ear of corn to pass under the strip. The controller then signals the actuator 276 to return the strip to the original position. The above described retention device is useful to obtain fill rates of up to 95% on a receiving conveyor (not shown) during operation. Without providing such a device, fill rates on a sustained basis of slightly less are obtained.

One of the advantages of the present invention is that even for extremely high production speeds, it is possible to maintain a maximum linear ear speed during processing of 30 to 50 feet per minute. It is generally known in the art that when ears travel with their longitudinal axes positioned parallel to a direction of travel, at linear velocities approaching about 200 feet per minute, ears of corn can become airborne and bruising and other damage is likely. The present invention is capable of delivering ears at a rate which is greater than twice the maximum known rate for end-to-end travel yet maintains a maximum ear velocity no greater than about 50 feet per minute in a long direction of each ear. Furthermore, little to no damage to the ears as a result of processing with the preferred device has been observed.

Although the above-described embodiments of the present invention employ the use of a vibratory feeder to deliver ears of corn to the eccentric conveyor of the present invention, it is to be understood that other means of delivering ears into a plurality of lanes may be used to load a receiving conveyor. For example, a conventional rubber belt conveyor could be used to feed the ears into a plurality of funnel type troughs which deliver ears into lanes on a moving conveyor.

Also, although the preferred embodiments employ feed rates on the delivery device 48 (shown in FIG. 1) of between about 30 and about 50 feet per minute, it is to be understood that this limit is due to the design characteristics of the machine. Other feed devices could be operated at speeds up to 200 feet per minute while still maintaining control over the ears. It has been discovered that the eccentric conveyor of the preferred embodiment works best at speeds up to about 70 ears per minute.

Also, the present invention is not limited to a device which deposits nine elongated objects per cycle onto a moving conveyor. It is preferred to select a number of lanes which is an odd number to obtain the greatest fill efficiency on the receiving conveyor. The number of lanes is limited in the case of feeding corn to a number which will conveniently fit within a pan having a width which is small enough to obtain an even distribution of the corn on the flat end. In the first preferred embodiment, the width of the flat portion 51 of the vibrating pan 50 is about five feet wide.

If a vibratory pan configuration is used, the rate of feed of each lane will be between about 30 and about 50 feet per minute. Based on this feed rate, the number of lanes is selected to obtain the desired capacity machine. According to the first preferred embodiment, a nine lane machine is capable of delivering about 440 ears per minute to the receiving conveyor. Although the first preferred embodiment employs nine lanes, a large number of lanes could be used to load elongated objects transversely onto a conveyor.

Although the present invention has been described with reference to preferred embodiments, workers skilled in the art will recognize that changes may be made in form and detail without departing from the spirit and scope of the invention.

What is claimed is:

1. A device for depositing a plurality of elongated objects transversely onto a receiving conveyor, comprising:

delivery means for delivering a substantially continuous stream of elongated objects substantially end-to-end in a plurality of lanes;

suspending means for suspending a leading group of spaced apart elongated objects exiting said delivery means directly above a receiving conveyor;

means for aligning in a direction transverse to a direction of travel of the objects in the lanes the leading group of elongated objects as the objects exit the lanes, and for transferring the aligned group of objects to said suspending means at substantially the same time wherein each group includes up to one object exiting each lane, the means for aligning the leading group of elongated objects, and for transferring the aligned group of objects to said suspending means including an eccentric conveyor, the eccentric conveyor comprising a frame and a plurality of eccentric pulleys rotatably mounted to the frame; and means for transferring the suspended group of elongated objects to the receiving conveyor having a receiving surface which moves in a direction substantially transverse to a direction of travel of the elongated objects in the lanes.

2. The device of claim 1, wherein the delivery means comprises a vibratory feeder including:

a vibrating pan having a substantially flat first end section, a corrugated central section having a plurality of valleys, wherein each valley defines one of the lanes; and a declining section.

3. The device of claim 1, wherein the eccentric conveyor further comprises:

at least two spaced apart shafts in substantially parallel relation mounted for rotation in the frame, the eccentric pulleys fixedly mounted on the shafts such that at least two eccentric pulleys are aligned in a plane; and means for rotating said shafts.

4. The device of claim 3 wherein the spacing between shafts is selected such that said eccentric pulleys are closely spaced.

5. The device of claim 3 wherein the eccentric pulleys have outer surfaces which are grooved, and further comprising an endless moving member extending into at least a portion of the grooves of the two pulleys located within the plane.

6. The device of claim 1, wherein the suspending means includes a group of elongated drop gates, each drop gate including a stationary frame, and at least one moving member mounted for pivotal movement to the frame, wherein each drop gate is aligned with a lane and is of a size and shape to receive an elongated object from said aligning means.

7. The device of claim 6, wherein the means for transferring the suspended group of elongated objects from the drop gate includes at least a first and second linking arm, wherein the linking arms are mounted for pivotal movement to each moving member, and further comprising a first and second pneumatic cylinder, each pneumatic cylinder pivotally connected at one end to the first linking arm and pivotally connected at the opposite end to the second linking arm.

8. The device of claim 2, and further comprising means for recycling elongated objects which have a position on the pan other than within one of said lanes as the objects exit the corrugated section.

9. The device of claim 3, wherein each eccentric pulley is driven at a surface speed of about 100 feet/minute.

10. The device of claim 3, and further comprising clutch means for intermittently engaging the means for rotating the shafts.

11. The device of claim 7, wherein each gate opens and closes substantially in unison.

12. The device of claim 7, wherein said cylinders operate at a speed sufficient to cause the elongated objects to fall substantially freely onto a surface of said receiving conveyor.

13. The device of claim 2, wherein there are nine valleys in said corrugated central section and said declining section includes nine troughs.

14. The device of claim 13, wherein each trough has a center, wherein a spacing between said centers is about 8 inches.

15. The device of claim 8, wherein the means for recycling elongated objects comprises a recycle chute located beneath said pan.

16. The device of claim 1, and further comprising a boost roller located between said delivery means and said means for transferring a group of elongated objects, wherein said boost roller is mounted for rotation on a stationary frame having a height adjustment.

17. The device of claim 1 wherein the receiving surface of the receiving conveyor is defined by an endless belt member and a plurality of transversely mounted bars, the bars positioned above the receiving surface and mounted for travel in the direction the receiving surface moves.

18. The device of claim 16, wherein said boost roller turns at a surface speed of about 250 feet/minute.

19. A device for feeding corn ears, comprising:
a vibratory trough feeder comprising a stationary frame, a pan having an ear receiving surface, a plurality of resilient members connected to the stationary frame and pan, means for causing the pan to vibrate including a two mass vibratory shaker, means for causing the ears to align substantially end to end in a direction of travel of the ears into a plurality of spaced apart lanes;
a receiving conveyor having an endless moving member for receiving ears of corn, the endless moving member moving in a direction substantially perpendicular to the lanes;
means for aligning a group of ears comprising up to one ear advancing from each lane, in a direction transverse to a direction of travel of the ears in the lanes as the ears exit from the lanes;
means for suspending the aligned group of ears above the receiving conveyor;
means for simultaneously transferring the group of ears into the means for suspending the ears above the receiving conveyor; and
means for causing the entire group of ears suspended above the receiving conveyor to drop substantially transversely onto a surface of the receiving conveyor.

20. The device of claim 19, wherein the receiving conveyor includes an ear receiving surface having a plurality of compartments for individually receiving an ear.

21. The device of claim 19, wherein the means for suspending a group of ears above the receiving conveyor comprises a plurality of hinged drop gates, each drop gate comprising a first and second leaf, each leaf including hinge means, and further comprising a drop gate shaft fixedly mounted onto a stationary frame, wherein the hinge means of the first and second leafs are mounted onto said shaft.

22. The device of claim 19, wherein the means for transferring the group of ears into the means for suspending the ears above the receiving conveyor comprises an eccentric conveyor including a pair of spaced apart substantially parallel first and second drive shafts, and a plurality of eccentric pulleys mounted onto said drive shafts, wherein at least one pulley of the first shaft lies in the same plane as a pulley of the second drive shaft.

23. The device of claim 22, wherein the means for causing the ears suspended above the receiving conveyor to drop substantially transversely onto the receiving conveyor comprises a first and second linking arm, the first linking arm pivotally connected to a first set of leafs, the second linking arm pivotally connected to a second set of leafs, and further comprising first and second cylinders mounted to the first and second linking arm, respectively, such that when the cylinders are actuated, the first and second set actuate together but in opposite directions, and the second set of leafs move in unison.

24. The device of claim 19 and further comprising means for separating the ears traveling in the lanes.

25. The device of claim 24, wherein the means for separating the ears traveling in the lanes includes a retention device, wherein the retention device comprises a shaft mounted transversely across said lanes onto a frame and pivotally for rotation, and a body mounted on the shaft, the body being of a size which when in a first position prevents a flow of ears in said lanes, and when in a second position allows the ears to flow.

26. The device of claim 3 wherein the pulleys remain substantially in phase during rotation.

27. A device for depositing a plurality of elongated objects transversely onto a receiving conveyor, comprising:
delivery means for delivering a substantially continuous stream of elongated objects substantially end-to-end in a plurality of lanes, the delivery means comprising a vibratory feeder including: a vibrating pan having a substantially flat first end section, a corrugated central section having a plurality of valleys, wherein each valley defines one of the lanes; and a declining section;
means for recycling elongated objects which have a position on the pan other than within one of the lanes as the objects exit the corrugated central section;
suspending means for suspending a leading group of spaced apart elongated objects exiting the delivery means directly above a receiving conveyor;
means for aligning in a direction transverse to a direction of travel of the objects in the lanes the leading group of elongated objects as the objects exit the lanes, and for transferring the aligned group of objects to the suspending means at substantially the same time wherein each group includes up to one object exiting each lane; and
means for transferring the suspended group of elongated objects to the receiving conveyor having a receiving surface which moves in a direction substantially transverse to a direction of travel of the elongated objects in the lanes.

28. A device for depositing a plurality of elongated objects transversely onto a receiving conveyor, comprising:

delivery means for delivering a substantially continuous stream of the elongated objects substantially end-to-end in a plurality of lanes;

suspending means for suspending a leading group of spaced apart elongated objects exiting the delivery means directly above a receiving conveyor, the suspending means including a group of elongated drop gates, each drop gate including a stationary frame, and at least one moving member mounted for pivotal movement to the frame, wherein each drop gate is aligned with a lane;

means for aligning in a direction transverse to a direction of travel of the objects in the lanes the leading group of elongated objects as the objects exit the lanes, and for transferring the aligned group of objects to the suspending means at substantially the same time, each drop gate of the suspending means sized and shaped to receive one of the elongated objects from the means for aligning and each group including up to one object exiting each lane; and means for transferring the suspended group of elongated objects to the receiving conveyor having a receiving surface which moves in a direction substantially transverse to a direction of travel of the elongated objects in the lanes.

29. The device of claim 28, wherein the means for transferring the suspended group of elongated objects from the drop gate includes at least a first and second linking arm, wherein the linking arms are mounted for pivotal movement to each moving member, and further comprising a first and second pneumatic cylinder, each pneumatic cylinder pivotally connected at one end to the first linking arm and pivotally connected at the opposite end to the second linking arm.

30. The device of claim 29, wherein each gate opens and closes substantially in unison.

31. The device of claim 29, wherein said cylinders operate at a speed sufficient to cause the elongated objects to fall substantially freely onto a surface of said receiving conveyor.

32. A device for depositing a plurality of elongated objects transversely onto a receiving conveyor, comprising:

delivery means for delivering a substantially continuous stream of elongated objects substantially end-to-end in a plurality of lanes;

suspending means for suspending a leading group of spaced apart elongated objects exiting the delivery means directly above a receiving conveyor;

means for aligning in a direction transverse to a direction of travel of the objects in the lanes the leading group of elongated objects as the objects exit the lanes, and for transferring the aligned group of objects to the suspending means at substantially the same time wherein each group includes up to one object exiting each lane;

means for transferring the suspended group of elongated objects to the receiving conveyor having a receiving surface which moves in a direction substantially transverse to a direction of travel of the elongated objects in the lanes; and a boost roller located between said delivery means and said means for transferring the suspended group of elongated objects, wherein said boost roller is mounted for rotation on a stationary frame having a height adjustment.

33. The device of claim 32, wherein said boost roller turns at a surface speed of about 250 feet/minute.

34. A device for feeding corn ears, comprising:

a vibratory trough feeder comprising a stationary frame, a pan having an ear receiving surface, a plurality of resilient members connected to the stationary frame and pan, means for causing the pan to vibrate, means for causing the ears to align substantially end to end in direction of travel of the ears into a plurality of spaced apart lanes;

a receiving conveyor having an endless moving member for receiving ears of corn, the endless moving member moving in a direction substantially perpendicular to the lanes;

means for aligning a group of ears comprising up to one ear advancing from each lane, in a direction transverse to a direction of travel of the ears in the lanes as the ears exit from the lanes;

means for suspending the aligned group of ears above the receiving conveyor, the means for suspending comprising a plurality of hinged drop gates, each drop gate comprising a first and second leaf, each leaf including hinge means, the means for suspending further comprising a drop gate shaft fixedly mounted onto a stationary frame, wherein the hinge means of the first and second leafs are mounted onto said shaft;

means for simultaneously transferring the group of ears into the means for suspending the ears above the receiving conveyor; and means for causing the entire group of ears suspended above the receiving conveyor to drop substantially transversely onto a surface of the receiving conveyor.

35. The device of claim 36, wherein the means for causing the ears suspended above the receiving conveyor to drop substantially transversely onto the receiving conveyor comprises a first and second linking arm, the first linking arm pivotally connected to a first set of leafs, the second linking arm pivotally connected to a second set of leafs, and further comprising first and second cylinders mounted to the first and second linking arm, respectively, such that when the cylinders are actuated, the first and second set actuate together but in opposite directions, and the second set of leafs move in unison.

36. A device for feeding corn ears, comprising:

a vibratory trough feeder comprising a stationary frame, a pan having an ear receiving surface, a plurality of resilient members connected to the stationary frame and pan, means for causing the pan to vibrate including a two mass vibratory shaker, means for causing the ears to align substantially end to end in a direction of travel of the ears into a plurality of spaced apart lanes;

a receiving conveyor having an endless moving member for receiving ears of corn, the endless moving member moving in a direction substantially perpendicular to the lanes;

means for aligning a group of ears comprising up to one ear advancing from each lane, in a direction transverse to a direction of travel of the ears in the lanes as the ears exit from the lanes;

means for suspending the aligned group of ears above the receiving conveyor;

means for simultaneously transferring the group of ears into the means for suspending the ears above the receiving conveyor, the means for simultaneously transferring comprising an eccentric conveyor, the eccentric conveyor including a pair of spaced apart substantially parallel first and second drive shafts and a plurality of eccentric pulleys mounted onto said drive shafts, at least one pulley of the first drive shaft and a pulley of the second drive shaft laying in a common plane; and means for causing the entire group of ears suspended above the receiving conveyor to drop substantially transversely onto a surface of the receiving conveyor.

37. A device for feeding corn ears, comprising:

a vibratory trough feeder comprising a stationary frame, a pan having an ear receiving surface, a plurality of resilient members connected to the stationary frame and pan, means for causing the pan to vibrate, means for causing the ears to align substantially end to end in a direction of travel of the ears into a plurality of spaced apart lanes;

a receiving conveyor having an endless moving member for receiving ears of corn, the endless moving member moving in a direction substantially perpendicular to the lanes;

means for separating the ears traveling in the lanes, the means for separating the ears traveling in the lanes including a retention device, the retention device comprising a shaft pivotally mounted onto a base frame such that the shaft is disposed transverse across the lanes and a body mounted on the shaft, the body being of a size which when in a first position prevents a flow of ears in said lanes, and when in a second position allows the ears to flow;

means for aligning a group of ears comprising up to one ear advancing from each lane, in a direction transverse to a direction of travel of the ears in the lanes as the ears exit from the lanes;

means for suspending the aligned group of ears above the receiving conveyor;

means for simultaneously transferring the group of ears into the means for suspending the ears above the receiving conveyor; and means for causing the entire group of ears suspended above the receiving conveyor to drop substantially transversely onto a surface of the receiving conveyor.

* * * * *